United States Patent [19]

Haney

[11] Patent Number: 5,297,764

[45] Date of Patent: Mar. 29, 1994

[54] AIR FOIL PROVIDING VORTEX ATTENUATION

[76] Inventor: William R. Haney, 6507 Foxboro Dr., Mayfield Village, Ohio 44143

[21] Appl. No.: 31,783

[22] Filed: Mar. 15, 1993

[51] Int. Cl.$^5$ .............................................. B64C 23/06
[52] U.S. Cl. ................................... 244/199; 244/90 R
[58] Field of Search .................... 244/199, 130, 91, 58

[56] References Cited

U.S. PATENT DOCUMENTS

| | | | |
|---|---|---|---|
| 3,090,584 | 5/1963 | Kuchemann et al. | 244/199 |
| 3,692,259 | 9/1972 | Yuar | 244/199 |
| 3,997,132 | 12/1976 | Erwin | 244/199 |
| 4,108,403 | 8/1978 | Finch | 244/199 |
| 4,132,375 | 1/1979 | Lamar | 244/90 R |
| 4,485,992 | 12/1984 | Rao | 244/90 R |
| 5,150,859 | 9/1992 | Ransick | 244/199 |

FOREIGN PATENT DOCUMENTS

| | | | |
|---|---|---|---|
| 3127257 | 1/1983 | Fed. Rep. of Germany | 244/199 |
| 850918 | 3/1953 | France | 244/199 |
| 1209801 | 3/1960 | France | 244/199 |
| 1564026 | 4/1969 | France | 244/199 |

Primary Examiner—Galen L. Barefoot
Attorney, Agent, or Firm—Ralph E. Jocke

[57] ABSTRACT

An airfoil (24) providing vortex attenuation includes an outboard area (28). The outboard area has a foil extension portion (30) having a high pressure surface (32). The high pressure surface has an arcuate shape that increases in length from a leading edge (36) to a trailing edge (38) of the airfoil. The outboard area further includes an orifice portion (40) with an opening (42) therein. The opening in the orifice portion has a swirler (44) mounted therein. The swirler and the high pressure surface cause the air passing under the wing toward the outboard area to rotate with controlled direction and velocity consistent with the rotational direction of a naturally occurring vortex at the outboard area of the wing. As a result, the natural tip vortex is attenuated reducing drag on the airfoil.

17 Claims, 4 Drawing Sheets

AIR FOIL PROVIDING VORTEX ATTENUATION

TECHNICAL FIELD

This invention relates to airfoils used in aircraft. Specifically, this invention relates to an airfoil which attenuates vortices that naturally occur at the outboard tip of an airfoil.

BACKGROUND ART

Airfoils are well known in the prior art. Aircraft wings, propellers and rotors are well known examples of airfoils. An aircraft wing achieves lift by causing the air that flows above it to travel at a higher rate of speed than the air passing underneath it. In accordance with Bernoulli's Principle, the air traveling at a higher rate of speed above the wing is at a lower pressure than the air under the wing. The result is an upwardly directed lifting force.

As a result of the higher air pressure under the wing, air vortices tend to form at the outboard tip. The reason the vortices are formed is explained with reference to FIG. 1. FIG. 1 shows a back view of a wing or other airfoil 10. As air flows past the wing, an area of relatively high pressure 12 is created below the wing. An area of relatively lower pressure 14 is created above the wing. At the outboard tip 16 air tends to spill over the tip from the higher pressure area 12 to the lower pressure area 14. When this occurs, the air tends to move in a rotational direction as indicated by Arrow V. This rotational movement of the air causes a vortex to form which extends a distance behind the moving airfoil.

The vortices that occur at the tips of airfoils have several drawbacks. First, the vortices consume energy that would otherwise be used to move the aircraft. As a result, the creation of a vortex increases drag. This drag is significant because the tangential velocity of a vortex on a wing may be as high as 70 percent of the free stream velocity of the air passing over the wing. This high velocity in the vortex consumes considerable energy.

A further drawback associated with wing tip vortices in aircraft is that the vortices extend a considerable distance behind the plane. As a result, the vortices pose hazards for following aircraft. This may result in the need to space the aircraft greater distances, particularly during takeoff and landing.

Efforts have been made in the past to attenuate the effect of airfoil tip vortices. U.S. Pat. No. 3,411,738 discloses an airfoil with outboard extensions designed to minimize the spillage of air over the wings. This design, which has "gull wing" type extensions that extend downwardly and outwardly from the ends of the wing, holds more of the air under the wing and attempts to direct the vortex downwardly away from the aircraft.

I previously developed a vortex generator for an airfoil which is shown in U.S. Pat. No. 3,596,854. My vortex generator operates to concentrate the vortex at the outboard tip of an airfoil and thereby minimize the scope of its deleterious effects.

None of the approaches known in the prior art minimize the problem of vortices to a desirable degree. Thus, there exists a need for an airfoil that attenuates the vortices at the outboard tip.

DISCLOSURE OF INVENTION

It is an object of the present invention to provide an airfoil with tip vortex attenuation.

It is a further object of the present invention to provide an airfoil that has reduced drag.

It is a further object of the present invention to provide an airfoil that achieves greater lift and reduces fuel consumption when used as a wing of an aircraft.

It is further object of the present invention to provide an airfoil that imparts controlled air movement with reduced rotational velocity from that which would naturally occur in a wing tip vortex.

It is a further object of the present invention to provide an airfoil with variable drag that may be used in an aircraft attitude or directional control system.

It is a further object of the present invention to provide a method for attenuation of vortices that form at the tips of airfoils.

It is a further object of the present invention to provide a method for reducing drag on a airfoil.

Further objects of the present invention will be made apparent in the following Best Modes for Carrying Out Invention and the appended claims.

The foregoing objects are accomplished in the preferred embodiment of the invention by an airfoil having vortex attenuation. The airfoil has a relatively high pressure side and a relatively low pressure side. The airfoil also has a leading edge and a trailing edge extending generally traverse of the direction of airflow past the foil.

The airfoil includes a foil extension portion in an outboard area. The extension portion is curved and extends arcuately in the direction of the high pressure area. The foil extension portion is bounded on the high pressure side by a high pressure surface that has an increasing arc length with proximity to the trailing edge.

The airfoil also includes a orifice portion in the outboard area and adjacent to the trailing edge. The orifice portion is ring shaped and has a generally circular opening therethrough. The opening in the orifice portion is contoured to mate smoothly with and be bounded by the high pressure surface of the foil extension about approximately one quarter to one half of the opening's circumference. The opening in the orifice portion includes a swirler therein. The swirler has means which impart circular motion to the air passing through the opening in the orifice portion.

In operation, air on the high pressure side of the airfoil moves not only past the foil in the traverse direction, but also in the outward direction toward the outboard area. This is because the air on the high pressure side attempts to spill over the tip of the airfoil to the low pressure area. However, as this moving air reaches the outboard area, the contour of the high pressure surface of the foil extension imparts rotational movement to the air. This rotational movement is in a direction opposite to that in which the air would rotate to form a naturally occurring vortex. As the air passes over the high pressure surface and through the opening in the orifice portion, further rotational movement of the air in the same or opposite direction to that of a naturally occurring vortex is imparted. Likewise, the swirler imparts further rotational movement. As a result, the velocity and energy of a vortex that is able to form at the tip of the airfoil is significantly attenuated. This results in reduced drag on the airfoil.

In alternative embodiments of the invention, the degree of vortex swirl imparted by the swirler may be made variable under the control of the pilot of the aircraft. This enables control of the amount of drag on the airfoil. When used in an aircraft, the amount of drag on the airfoil may be selectively varied and may be used as a means for controlling the attitude or direction of the aircraft.

BEST MODES FOR CARRYING OUT INVENTION

Figure 1:
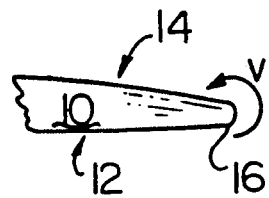
FIG. 1 is a rear view of a conventional prior art airfoil.
Figure 2:
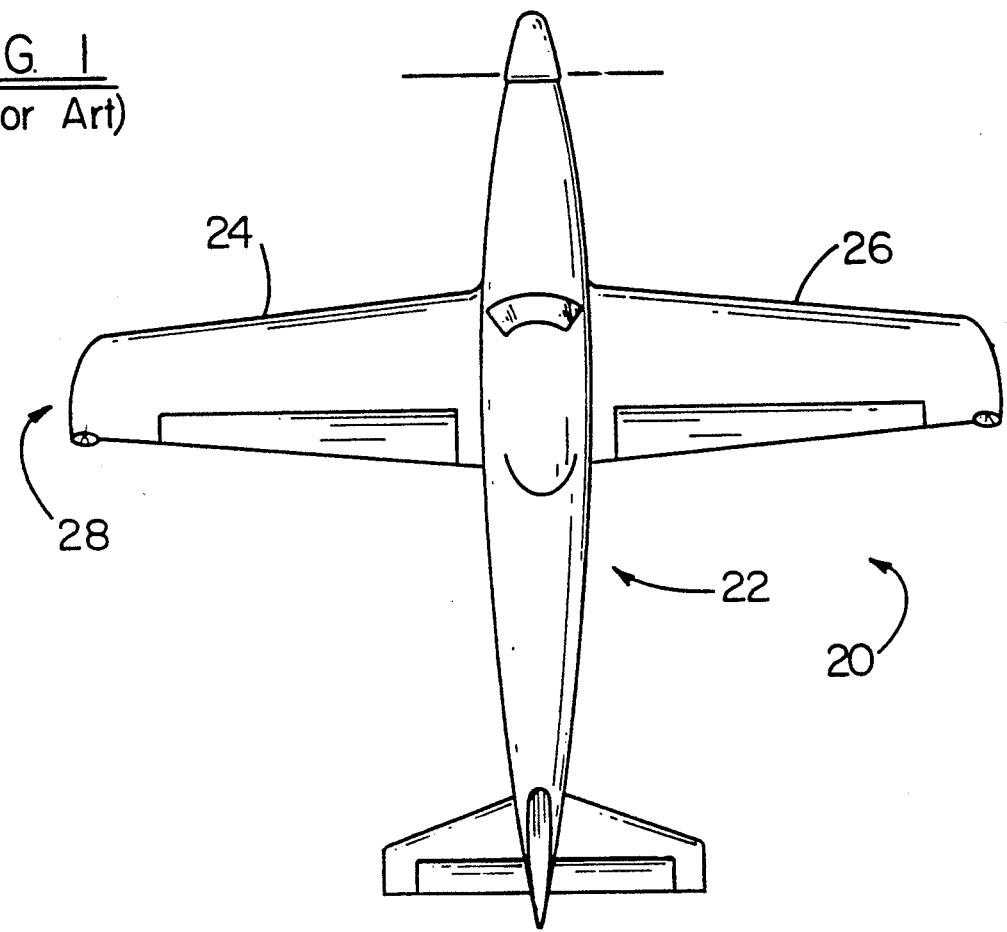
FIG. 2 is a plan view of an aircraft that includes wing airfoils with vortex attenuation of the present invention.

Referring now to the drawings and particularly FIG. 2, there is shown therein an aircraft generally indicated 20. The aircraft has a fuselage 22 and primary airfoils which are wings 24 and 26. Wings 24 and 26 incorporate the vortex attenuation features of the present invention.

Wings 24 and 26 are identical except that they are mirror images of each other. Therefore, only wing 24 will be described in detail.

Figure 3:
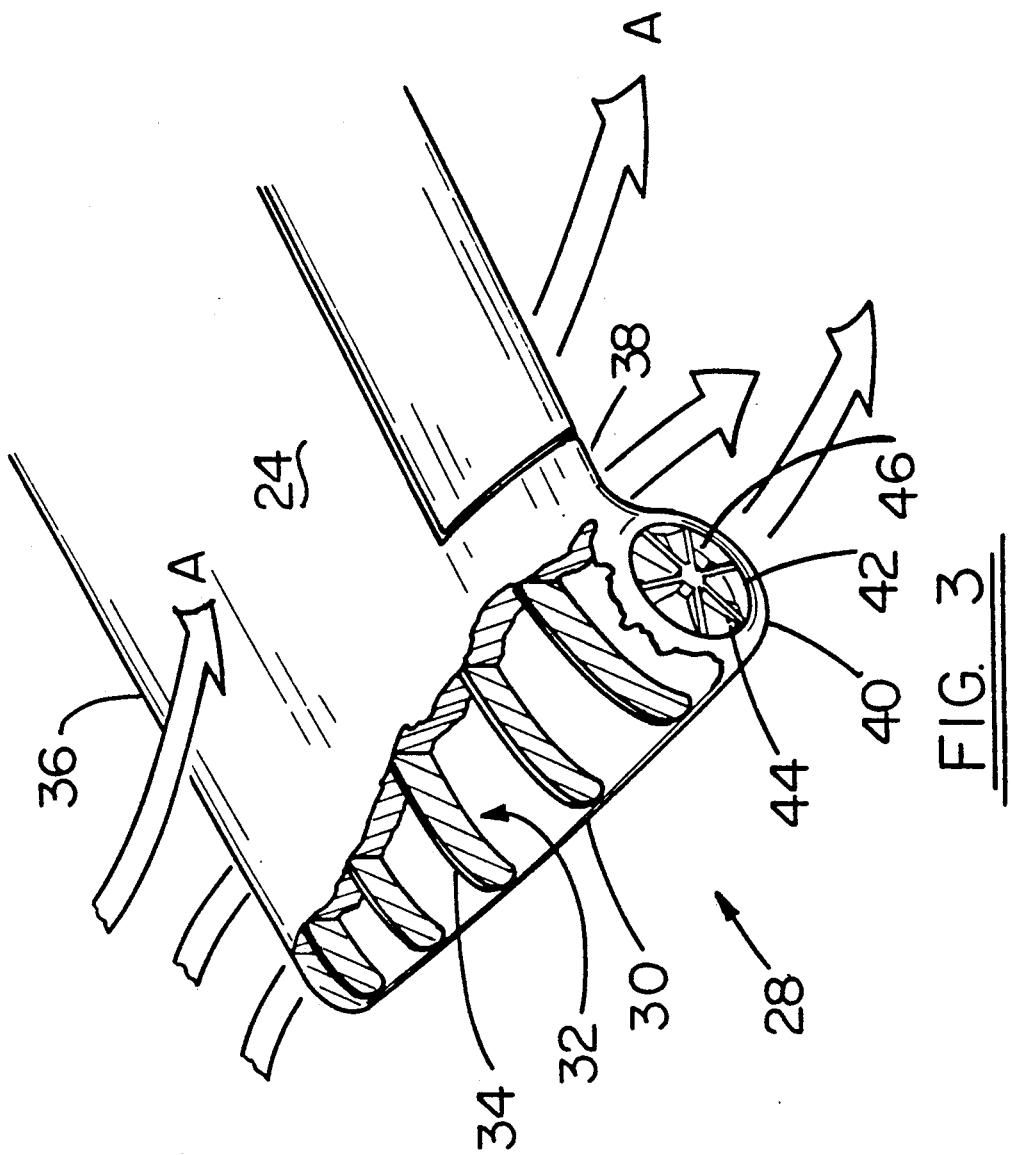
FIG. 3 is a multi-sectional top isometric view of the foil extension portion and orifice portion of an airfoil of the present invention.
Figure 4:
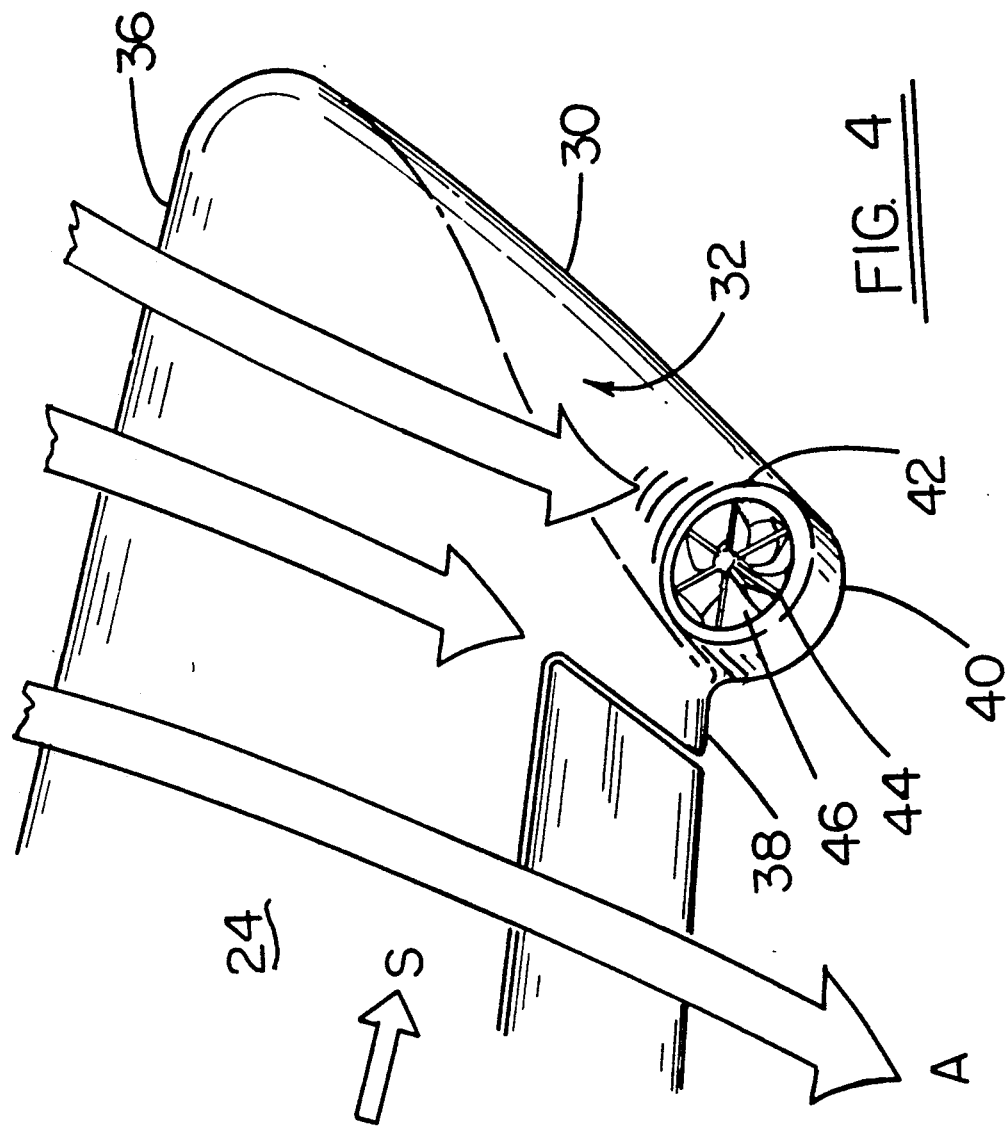
FIG. 4 is a bottom isometric view of the airfoil, and foil extension and orifice portions shown in FIG. 3.

Wing 24 has an outboard area 28. As shown in FIGS. 3 and 4, outboard area 28 of the wing includes a foil extension portion 30. The foil extension portion is bounded on the underside by a high pressure surface 32. The foil extension portion is bounded on the top, or low pressure side, by a curved low pressure surface 34.

High pressure surface 32 extends in a curving arc in cross section. The arc extends toward the high pressure area. The arcuate character of the high pressure surface 32 is relatively small adjacent a leading edge 36 of the airfoil. The length of the arc increases as the high pressure surface approaches the trailing edge. Adjacent the trailing edge the high pressure extends in an arc of approximately 90 degrees. In other embodiments the arc can be greater, extending to as much as 180 degrees.

The outboard area further includes an orifice portion 40. Orifice portion 40 is generally ring shaped and includes a generally circular opening extending therethrough. A circular opening 42 extends generally traverse of the direction of airflow passing the wing and is directed slightly outboard from the fuselage. In other embodiments the direction of outboard airflow may be higher, as high as 40 degrees outboard from the fuselage.

Mounted in the orifice opening is a swirler 44. Swirler 44 is comprised of stationary vanes 46. The vanes 46 of swirler 44 tend to impart rotational motion to the air passing through opening 42. As viewed in FIG. 3, the swirler 44 causes the air to move in a controlled clockwise direction. However, in other embodiments the vanes may be directed to impart counterclockwise flow.

Although the vanes of swirler 44 shown in FIGS. 3 and 4 are mounted at a fixed angle, in alternative embodiments which are later discussed, the angle of vanes 46 may be made variable. Variation of the angle of the vanes is designed to change the amount of swirling action imparted to the air passing through opening 42. This variable pitch of the vanes may be desirable for purposes such as controlling the attitude or direction of the aircraft, and also for tailoring the vortex attenuation to particular speeds and other conditions of the aircraft.

In operation, air flows past wing 24 in the direction of Arrows A as shown in FIGS. 3 and 4. This causes a higher pressure area to form underneath the wing and a lower pressure area to form above it. As the air in high pressure area naturally tends to flow towards the area of lower pressure, the air under the wing not only moves traversely but also moves in the outward direction as indicated by Arrow S in FIG. 4.

As the outboard movement of air under the wing engages the high pressure surface, it is turned and begins to rotate in the direction toward the high pressure area. As the air under the wing moves towards the trailing edge 38 it is further turned by the increasing arc of the high pressure surface. Thus, the air flowing under the wing is confined and directed rearward prior to engagement with orifice portion 40.

The air under the extension portion 30 eventually travels rearward along the high pressure surface and engages orifice portion 40. Because orifice portion 40 extends generally traverse to the direction of airflow, air is caused to flow through opening 42. As the air passes through the opening it is usually directed to rotate in the clockwise direction as shown in FIG. 3 by the circular character of the opening as well as vanes 46 of swirler 44.

The rotational movement imparted to the air by the extension portion and orifice portion is controlled to decrease the angular velocity of the tip vortex from the velocity that the air would normally rotate as it spills over the outboard tip of the wing. For example, in FIG. 3, air would naturally flow around the outboard area of the wing in a clockwise direction creating an excessively strong clockwise rotating vortex. Through use of the invention however, air under the wing is moved in a controlled rotational direction. This attenuates the natural vortex and greatly reduces its speed. As a result, less energy is lost and there is less drag on the wings.

The reduction of drag on the wing provides several advantages. First, there is less wasted energy and fuel consumption is reduced. The wings also provide more lift. Further, because the vortex is attenuated, trailing planes are affected less by the vortex.

It will be understood by those skilled in the art that although the embodiment shown in FIGS. 3 and 4 employs a swirler to impart rotational motion to the air, in other embodiments greater arcuate contour of the high pressure surface of the foil extension portion may be used as a further means for imparting rotational movement to the air. In other embodiments the swirler in the opening in the orifice portion may be omitted, or additional swirling means other than a fixed vane device may be used in the orifice opening. Alternatively, the swirler may be made retractable so that it would not be operative during icing conditions or in other circumstances.

Figure 5:
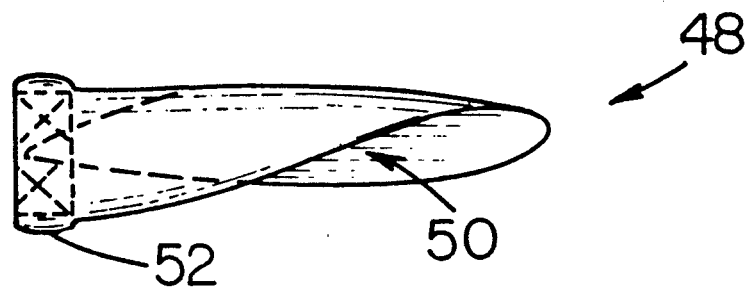
FIG. 5 is a side view of an alternative airfoil of the present invention.

In FIGS. 2 through 4 the vortex attenuation structure is shown mounted generally below the wing of the aircraft. However, in other embodiments such as the one shown in FIGS. 5 and 6 the airfoil may have the vortex attenuation structure at the wing centerline. FIG. 5 shows a side view of such an alternative wing 48. Wing 48 includes a high pressure surface 50 that is recessed upward. The orifice portion 52 and swirler 54 of wing 48 are generally centered at about the wing centerline.

Figure 6:
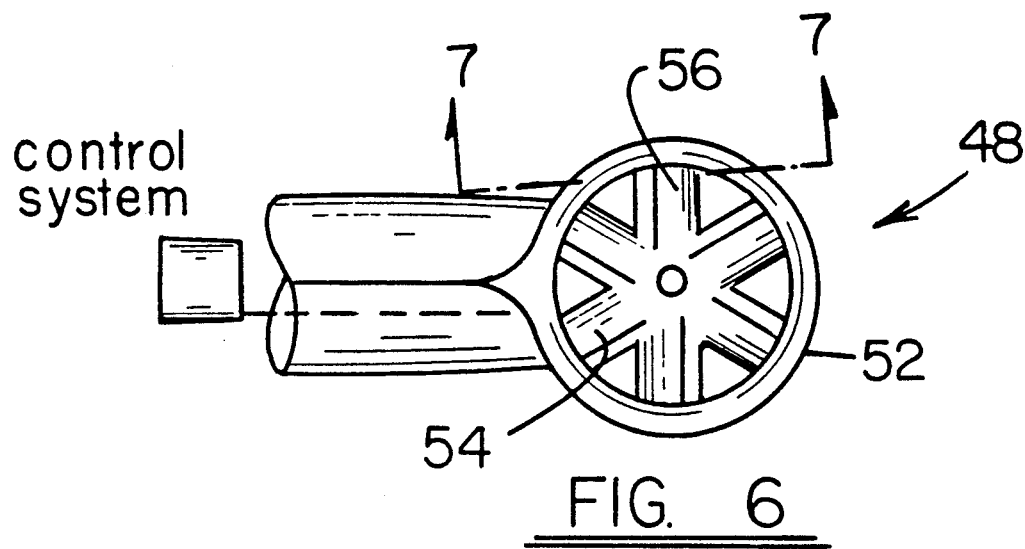
FIG. 6 is a back view of the airfoil shown in FIG. 5.

As shown in FIGS. 5 and 6, the high pressure surface 50 has a greater arc than the previously described embodiment, and thus imparts more rotational motion to the air passing underneath to counter the natural occurring vortex. Of course, as will be understood by those in skilled in the art, in other embodiments of the invention, the high pressure surface may be positioned to be either above or below the wing centerline.

As shown in FIGS. 2 through 4, the opening in the orifice portion of the outboard area is directed at an angle that is divergent to the fuselage of the plane. This is often desirable in applications for providing greater lift. However, in other embodiments of the invention, the opening in the orifice may be directed toward the fuselage of the plane, and in some applications this may reduce drag.

Alternative embodiments of the invention may be used for aircraft attitude and directional control. For example, by varying the angle of vanes 46 of swirler 44 the strength of the natural vortex at the outboard area of the wing may be varied. As the strength of the vortex is proportional to the amount of drag on the wing surface, selectively varying angle of the swirler vanes may be used to adjust the attitude or direction of the aircraft.

Figure 7:
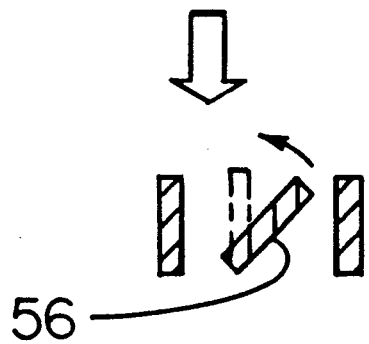
FIG. 7 is a partially sectioned view of a swirler vane having changeable attitude, with the section taken along line 7—7 in FIG. 6.

This may be accomplished by changing the angle of the vanes in the swirler. For example, a vane 56 of swirler 54 is shown in cross section in FIG. 7. To reduce the vortex attenuation effect, the vane 54 is moved to the position shown in phantom in FIG. 7. In this position the vane, as well as the other vanes of the swirler which, are moved to a similar angle, impart less swirl to the air passing through the opening in the orifice portion. As a result, the drag varies on the airfoil.

If the aircraft has a pair of opposed wings for example, and each of them includes the vortex attenuation feature with swirlers that are variable, the amount of vortex attenuation at one wing may be reduced while the other is held constant or varied differently. This will result in a difference in the drag on the wings and will cause the aircraft to turn. By selectively varying the amount of drag, the aircraft attitude and/or direction may be controlled.

It will be further understood by those skilled in the art that although the invention is shown as mounted on the primary airfoils of an aircraft it may be applied to other airfoil surfaces. In addition, the principles of the invention may be applied to airfoils used in applications other than aircraft.

Thus, the new airfoil with vortex attenuation of the present invention achieves the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the exact details shown and described.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

I claim:

1. An airfoil including vortex attenuation mean, said airfoil having a relatively high pressure side and a relatively low pressure side upon movement of said foil in a forward direction relative to surrounding air, said airfoil having a trailing edge relative to airflow past said foil, and an outboard area, said vortex attenuation means comprising:

a foil extension portion on said foil in said outboard area, said foil extension portion having a high pressure surface adjacent to and as a smooth continuation of said high pressure said of said foil, said high pressure surface extending arcuately and concavely towards said high pressure side, the spanwise arcuate cross sectional length of said high pressure surface increasing with proximity to said an orifice portion on said airfoil, said orifice portion adjacent said trailing edge and including an opening extending generally traverse of the forward direction and adapted for passing air therethrough, said opening including an arcuate surface portion bounding said opening, said arcuate surface portion in conforming contour with said adjacent high pressure surface and a smooth continuation thereof.

2. The airfoil according to claim 1 and further comprising swirling means in said opening in said orifice portion, said swirling means adapted for turning air passing through said opening in a rotational direction.

3. The airfoil according to claim 2 wherein said orifice portion and said opening therein are generally circular in cross section.

4. The airfoil according to claim 3 wherein said foil extension portion is bounded by a low pressure surface, said low pressure surface adjacent and directly exposed to said low pressure side, said low pressure surface extending arcuately and towards said high pressure side, said arcuate length in cross section of said low pressure surface increasing with proximity to said trailing edge.

5. The airfoil according to claim 4 wherein said swirling means includes adjusting means for varying a velocity imparted to air passing through said opening in said orifice portion.

6. The airfoil according to claim 5 wherein said swirling means comprises at least one vane of variable pitch.

7. The airfoil according to claim 4 wherein said swirling means includes adjusting means for varying the rotational direction and velocity imparted to air passing through said opening in said orifice portion.

8. The airfoil according to claim 4 wherein said arcuate surface portion of said opening is in mating contour with said high pressure surface about an arc of at least 90 degrees.

9. The airfoil according to claim 8 wherein said airfoil is a generally horizontally extending wing, and said low pressure area is adjacent an upper surface of said wing, and said high pressure area is adjacent a lower surface of said wing, and wherein said high pressure surface extends generally further downward with increasing proximity to said orifice portion.

10. The airfoil according to claim 1 and further comprising swirling means in said orifice portion for imparting rotational movement to air passing therethrough.

11. The airfoil according to claim 10 and further comprising swirl adjusting means for varying the direction and degree of rotational motion imparted to air passing said swirling means.

12. The airfoil according to claim 11 and further comprising an opposed airfoil identical to said first airfoil but a mirror image thereof, and extending in a manner generally opposite thereto, and further comprising differential swirl control means in connection with said adjusting means for imparting differing degrees of rotational motion to said air passing through said swirling means of said first airfoil and said swirling means of said opposed airfoil.

13. The airfoil according to claim 1 wherein said foil extension portion is bounded by a low pressure surface, said low pressure surface adjacent and directly exposed to said high pressure side, said low pressure area extending arcuately and convexly towards said high pressure side, said arcuate convex length in cross section of said low pressure surface increasing with proximity to said trailing edge and in smoothly conforming continuous contour with said orifice portion.

14. A method for attenuating vortices at an outboard end of an airfoil, comprising the steps of:
moving said airfoil through air in a forward direction to develop a high pressure area on a first side of said foil and a low pressure area on an opposed side of said foil and vortex air movement about an outboard end of said foil as air moves from said high pressure area to said low pressure area;
deflecting said airflow about said outboard end with foil extension means deflecting said vortex airflow in a rotational direction, said rotational direction opposed to a direction of said vortex air movement about said outboard end, providing said foil extension means with a foil extension portion on said outboard end having by a high pressure surface adjacent to and as a smooth continuation of said high pressure area, extending said high pressure surface arcuately and concavely toward said high pressure area, increasing the spanwise concave arcuate cross sectional length of said high pressure surface with proximity to a trailing edge of said airfoil, and providing said foil extension means with an orifice portion adjacent said trailing edge and including an opening extending generally traverse of the forward direction and passing air therethrough, providing said opening with an arcuate surface portion bounding said opening, conforming said arcuate surface portion with the contour of said adjacent high pressure surface and making if a smooth continuation thereof.

15. The method according to claim 14 and further comprising the step of passing said airflow deflected by said foil extension means through swirler means adjacent a trailing edge of said airfoil and inside said opening in said orifice portion, said swirler means adapted for turning air passing said swirler means.

16. The method according to claim 15 wherein said swirler means is variable in the direction and degree to which passing air is turned thereby, and further comprising the step of varying the turning motion imparted to the air passing said swirler means whereby the drag and lift forces on said airfoil is varied.

17. A method for attenuating vortices at an outboard end of an airfoil of an aircraft and directionally controlling said aircraft, comprising the steps of:
moving said airfoil of said aircraft through air in a forward direction to develop a high pressure area on a first side of said foil and a low pressure area on an opposed side of said foil and vortex air movement about an outboard end of said foil as air moves from said high pressure area to said low pressure area;
deflecting said airflow about said outboard end with foil extension means deflecting said vortex airflow in a rotational direction, said rotational direction opposed to a direction of said vortex air movement about said outboard end:
passing said airflow deflected by said foil extension means through swirler means adjacent a trailing edge of said airfoil, said swirler means adapted for turning air passing said swirler means, and wherein said swirler means is variable in the direction and degree to which passing air is turned thereby; and
varying the turning motion imparted to the air passing said swirler means whereby the drag and lift forces on said airfoil is varied to directionally control said aircraft.

* * * * *

UNITED STATES PATENT AND TRADEMARK OFFICE
CERTIFICATE OF CORRECTION

PATENT NO. : 5,297,764
DATED : March 29, 1994
INVENTOR(S) : William R. Haney It is certified that error appears in the above-identified patent and that said Letters Patent is hereby corrected as shown below:

Column 6, Line 12

"mean" is changed to
--means--

Column 6, Line 22

"high pressure said" is changed to
--high pressure side--

Column 6, Line 26

After "said" at the end of the
line the following is inserted
--trailing edge of said airfoil;--

Signed and Sealed this

Twenty-fifth Day of October, 1994

Attest:

BRUCE LEHMAN

Attesting Officer    Commissioner of Patents and Trademarks